United States Patent
Bodiga et al.

(10) Patent No.: US 11,146,978 B2
(45) Date of Patent: Oct. 12, 2021

(54) KPI ANOMALY DETECTION FOR RADIO ACCESS NETWORKS

(71) Applicant: T-Mobile USA, Inc., Bellevue, WA (US)

(72) Inventors: Prem Kumar Bodiga, Bellevue, WA (US); Norlinda Langub, Mill Creek, WA (US); Adam Lemow, Seattle, WA (US); Hermie Padua, Seattle, WA (US); John Carlo Ventura, Sammamish, WA (US); Ariz Jacinto, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/783,006

(22) Filed: Feb. 5, 2020

(65) Prior Publication Data
US 2021/0243623 A1 Aug. 5, 2021

(51) Int. Cl.
*H04W 24/08* (2009.01)
*H04W 24/04* (2009.01)

(52) U.S. Cl.
CPC .......... *H04W 24/08* (2013.01); *H04W 24/04* (2013.01)

(58) Field of Classification Search
CPC ..... H04W 8/26–30; H04W 88/08–188; H04W 92/02–06; H04W 92/10–24
See application file for complete search history.

(56) References Cited

U.S. PATENT DOCUMENTS

| | | | |
|---|---|---|---|
| 9,119,086 B1* | 8/2015 | Ouyang | H04L 41/5087 |
| 9,706,515 B1 | 7/2017 | Chadwick | |
| 2015/0131537 A1* | 5/2015 | Chiang | H04L 5/0076 370/329 |
| 2017/0032266 A1* | 2/2017 | Gopalakrishnan | G06N 7/005 |
| 2017/0078171 A1 | 3/2017 | Tapia et al. | |
| 2017/0200088 A1* | 7/2017 | Yang | G06F 11/3006 |
| 2017/0310546 A1* | 10/2017 | Nair | H04L 41/0654 |
| 2019/0239101 A1 | 8/2019 | Ouyang et al. | |
| 2020/0053108 A1 | 2/2020 | Cili et al. | |

(Continued)

OTHER PUBLICATIONS

U.S. Appl. No. 16/539,535, Final Office Action dated Mar. 23, 2021, 30 pages.

(Continued)

*Primary Examiner* — San Htun
(74) *Attorney, Agent, or Firm* — Han Santos, PLLC (57) ABSTRACT

An analyzer configured to monitor a radio access network (RAN) of a cellular network is provided. The RAN includes multiple clusters that each includes multiple sites and multiple cells. The analyzer receives a multiple key performance indicator (KPI) measurements from the multiple clusters. Each KPI measurements generated for one of several KPI types. The analyzer receives information identifying anomalous KPI measurements in the received KPI measurements. For a cluster of the RAN, the analyzer identifies one or more common anomalous KPI types that satisfy a ubiquity criterion. The analyzer ranks the identified common anomalous KPI types for the cluster based on an anomaly metric that is derived from the anomalous KPI measurements generated for each identified common anomalous KPI type. The analyzer outputs a list of common anomalous KPI types for the cluster based on the ranking.

15 Claims, 8 Drawing Sheets

(56) References Cited

U.S. PATENT DOCUMENTS

| | | |
|---|---|---|
| 2020/0134061 A1 | 4/2020 | Gaber et al. |
| 2020/0252310 A1 | 8/2020 | Thampy et al. |
| 2020/0290641 A1 | 9/2020 | Kawakami |
| 2020/0344252 A1 | 10/2020 | Menon et al. |

OTHER PUBLICATIONS

U.S. Appl. No. 16/539,535, Non-Final Office Action dated Nov. 16, 2020, 23 pages.

* cited by examiner

| | CLUSTER 1 MOST COMMON ANOMALOUS KPI |
|---|---|
| 1 | (C) VOLTE HANDOVER ATTEMPTS NO |
| 2 | (F) VOLTE ERLANGS |
| 3 | (H) E RAB SETUP ATTEMPTS QCI1 |
| 4 | AVERAGE RRC CONNECTED UES |
| 5 | MAXIMUM RRC CONNECTED UES |
| 6 | PCT PDCCH ALLOCATIONS WITH 3 OFDM SYMBOL |
| 7 | TOTAL PDCCH ORDER ATT E UTRAN |
| 8 | INITIAL PDCCH ORDER ATT E UTRAN |
| 9 | PCT PDCCH ALLOCATIONS WITH 1 OFDM SYMBOL |
| 10 | AVG SYSB PDCCH |
| 11 | AVG SINR FOR PUCCH |
| 12 | SINR PUCCH AVG |
| 13 | AVG RTWP RX ANTENNA 1 |
| 14 | AVG RTWP RX ANTENNA 4 |

← 300

| | CLUSTER 2 MOST COMMON ANOMALOUS KPI |
|---|---|
| 1 | VOLTE HANDOVER ATTEMPTS NO |
| 2 | E RAB SETUP ATTEMPTS QCI1 |
| 3 | VOLTE ERLANGS |
| 4 | INITIAL PDCCH ORDER ATT E UTRAN |
| 5 | TOTAL PDCCH ORDER ATT E UTRAN |
| 6 | CSFB ATT UE IDDLE MODE |
| 7 | VOICE CALL ATTEMPTS CSFB |
| 8 | HO ATTEMPTS INTER ENB X2 BASED |
| 9 | ERAB REL ENB RNL RED |
| 10 | TOTAL HO FAILURE RATE INTER ENB X2 BASED |
| 11 | No Anomalies |
| 12 | No Anomalies |
| 13 | No Anomalies |
| 14 | No Anomalies |

← 302

Top Sites in Cluster 1
with Anomalies for KPI type
"E RAB SETUP ATTEMPTS QCI1"

DLA02174A31    7
DLA02174A21    6
LLA02625A31    5
LLA02139A31    4
LLA02174A31    2

Vendor 1

| CLASSIFICATION | MAJOR KPI | CLUSTER 1 | CLUSTER 2 | CLUSTER 3 | CLUSTER 4 |
|---|---|---|---|---|---|
| ACCESSIBILITY | DATA AFR | Normal | Normal | Normal | Normal |
| ACCESSIBILITY | VOICE AFR | Normal | Normal | Normal | Normal |
| QUALITY | BAD PUSCH SINR | Normal | Normal | Normal | Improved |
| RETAINABILITY | DATA DCR | Normal | Normal | Degraded | Degraded |
| RETAINABILITY | VOLTE DCR | Normal | Normal | Normal | Normal |
| THROUGHPUT | AVG UE DL THPT | Normal | Normal | Normal | Normal |
| THROUGHPUT | AVG UE UL THPT | Improved | Improved | Improved | Improved |
| TRAFFIC | CELL AVAIL | Normal | Normal | Normal | Abnormal |
| TRAFFIC | DL DATA VOL | Normal | Normal | Normal | Normal |
| TRAFFIC | DL PRB UTIL | Normal | Normal | Normal | Normal |
| TRAFFIC | UL DATA VOL | Normal | Normal | Normal | Abnormal |
| TRAFFIC | UL PRB UTIL | Normal | Normal | Abnormal | Abnormal |
| TRAFFIC | VOLTE ERL | | | | |

500

| Vendor 1 Top Sites in Cluster 2 with Anomalies for KPI "CELL AVAIL" | |
|---|---|
| NYB0806A | 6.84%, 0.10 |
| NYB0805A | 6.52%, 0.09 |
| BQ06164A | 5.76%, 0.08 |
| BQ04562C | 5.71%, 0.08 |
| BQ06159A | 2.84%, 0.03 |

KPI ANOMALY DETECTION FOR RADIO ACCESS NETWORKS

BACKGROUND

A performance indicator or key performance indicator (KPI) is a type of performance measurement, KPIs evaluate the degree of success of an organization or of particular activities (such as projects, programs, products and other initiatives) in which the organization engages. The organization may choose the KPIs based on what is important to the organization, e.g., based on the present state of the business and its key activities.

A communications service provider such as an Internet service provider or a mobile network operator may monitor a vast array of provider equipment and user equipment for KPIs. Analysis of the KPIs may yield useful insight for the service provider as well as for businesses that are subscribers of the service. To perform the analysis, an administrator may create dashboards or spreadsheets to study the data trends and seasonality. However, the amount of data available for KPIs in these instances may be vast, so the analysis of the KPI data can be very tedious and time consuming.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to anomaly detection and analysis techniques that facilitate the detection and analysis of anomalies based on continuously collected key performance indicators (KPIs) from the components of a Radio Access Network (RAN). The RAN is part of a cellular network that also includes a core network. The RAN includes multiple clusters that each includes multiple sites and multiple cells, each site communicates with cellular devices that are located in one or more cells over one or more frequency divisions or time divisions.

A KPI analyzer program runs as an application at a computing device at a network node of the core network. The KPI analyzer receives multiple KPI measurements from the multiple sites in the multiple clusters of the RAN, each of the multiple KPI measurements generated for one of several KPI types. Anomaly detection is performed on the received KPI measurements. The KPI analyzer in turn analyzes the KPI measurements collected from the clusters of the RAN.

For example, for each cluster of the RAN, the KPI analyzer identifies one or more anomalous KPI types that satisfy a ubiquity criterion as common anomalous KPI types. A particular KPI type satisfies the ubiquity criterion when more than a threshold percentage of the sites in the cluster generated for the particular KPI type have anomalies. The KPI analyzer ranks the identified common anomalous KPI types for a cluster based on an anomaly metric that is derived from the anomalous KPI measurements of each identified common anomalous KPI type. The KPI analyzer outputs a list of KPI types based on the ranking of the identified common anomalous KPI types.

Figure 1:
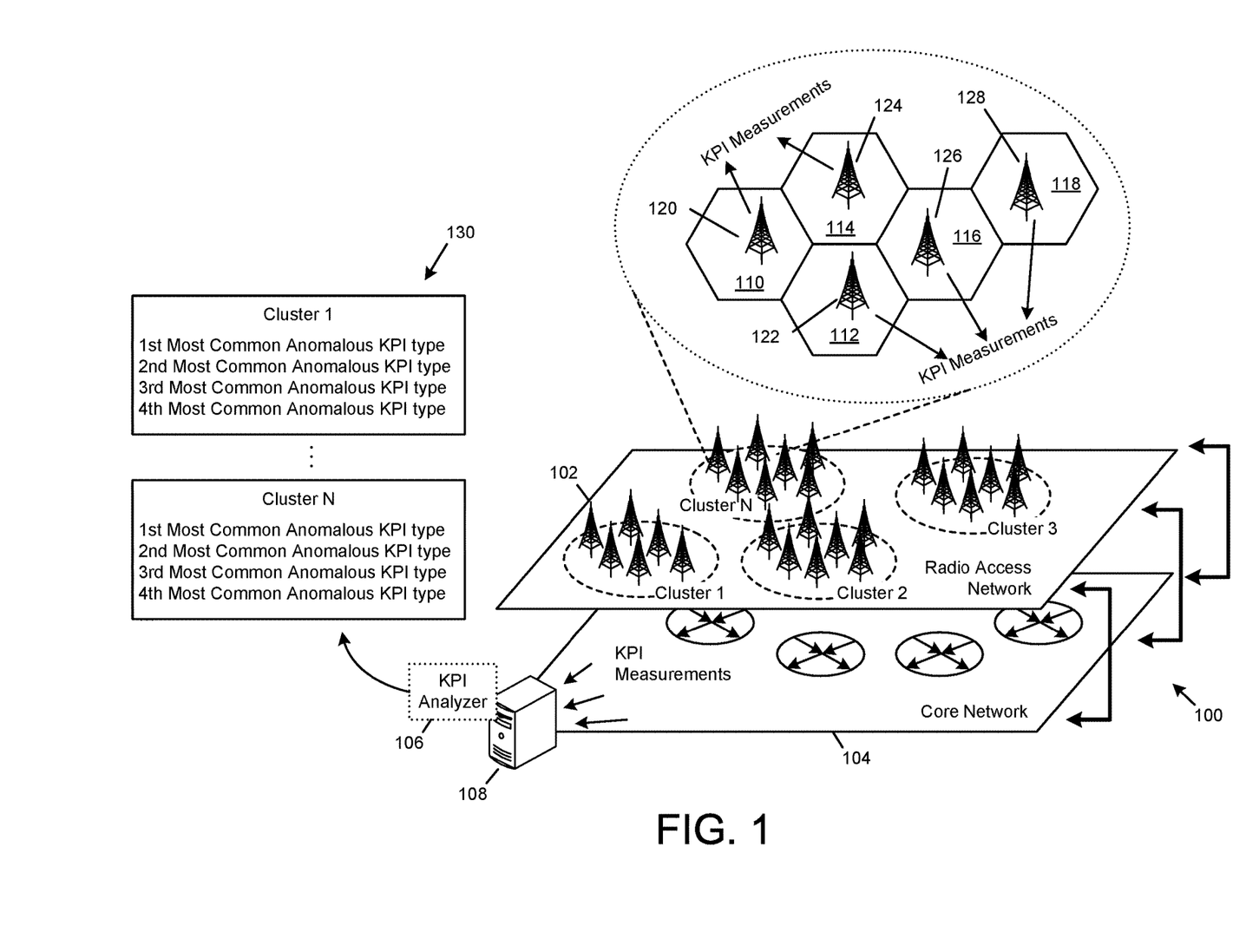
FIG. 1 conceptually illustrates a cellular network that includes a Radio Access Network (RAN) and a core network, the cellular network being monitored by a KPI analyzer that analyzes KPI measurements collected from the RAN.

FIG. 1 conceptually illustrates a cellular network 100 that includes a Radio Access Network (RAN) 102 and a core network 104, the cellular network 100 being monitored by a KPI analyzer 106 that analyzes KPI measurements collected from the RAN 102.

The RAN 102 implements a radio access technology that allows user equipment (UE) such as a mobile phone, a computer, or any remotely controlled machine to access the core network 104. The radio access technology is implemented by base stations (e.g., Evolved Node B, macrocell, femtocell, picocell, etc.) at various physical cellular sites. Each cellular site (or site) supports one or more "cells" or physical areas of radio coverage. A cellular or mobile device located within a cell may use the cell's corresponding site or sites to wirelessly access the core network 104 of the cellular network 100 over one or more frequency bands of the radio access technology.

The sites of the RAN 102 that are located near a same location are recognized and managed as a cluster. In some embodiments, each cluster of sites corresponds to a specific geographical area, such as a Los Angeles cluster, a Seattle cluster, a New York cluster, a Boston cluster, etc. In the example of FIG. 1, the RAN 102 includes clusters 1, 2, 3, . . . , N. The cluster N includes cells 110, 112, 114, 116, and 118 that are respectively supported by sites 120, 122, 124, 126, and 128. Each site maintains various statistics that are used to generate various types of KPI measurements. A site may be equipped with sensors and/or computing devices that produce thousands of types of KPI measurements. These KPI measurements may be specific to the site, to the cell(s) supported by the site, and/or to the frequency divisions or time divisions used by the site. For example, the computing devices at the site 120 may generate KPI measurements specific to the site 120, to the cell 110, or to any of the frequency or time divisions of the cell 110.

There are many different types of KPI measurements that may be taken at each site. These KPI types may relate to the number of hand-over attempts at the site, uplink performance, downlink performance, signal to interference plus noise ratio (SINR), measures of offered load or carried load on service providing elements, etc. These KPI measurements are available for retrieval by the KPI analyzer 106 (running on the computing device 108) through the core network 104. Different sites may generate KPI measurements of a same KPI type, e.g., the site 120, 122, 124, 126, and 128 may all generate KPI measurements generated for a KPI type that relate to the number of hand-over attempts.

The core network 104 include routers, switches, or other types of data forwarding elements for conducting data traffic (e.g., packet traffic) between various network endpoints such as user devices, base stations, hotspots, and other types of computing resources. The core network also provides access to external networks such as the Internet. The core network 104 may include components that provide services to the subscribers of the cellular network 100 and track positions of the user devices. The core network 104 may include a packet network, e.g., an Evolved Packet Core (EPC) that interconnects different components generated for an Evolved Packet System (EPS). EPC is a framework for providing converged voice and data on a 4G LTE network. EPC unifies voice and data on an Internet Protocol (IP) service architecture. The EPC allows the operator of the cellular network 100 to deploy and operate one packet network for 2G, 3G, 4G, 6G, wireless local area network (WLAN), and fixed access such as Ethernet, DSL, cable, and fiber.

The KPI analyzer 106 is a program operating on the computing device 108, which is attached to (or operating as) a network node of the core network 104 of the RAN 102. The computing device 108 receives the KPI measurements generated by different components of the RAN 102 through the network elements of the core network 104. The KPI analyzer 106 in turn analyzes the received KPI measurements and provide a summary 130.

In some embodiments, anomaly detection is performed on the KPI measurements. The detected anomalies of the KPI measurements are reported to the KPI analyzer 106. The KPI analyzer 106 provides a static or dynamic summary of the RAN's status by categorizing the anomalies according to their ubiquity, severity, locality, etc. For example, the KPI analyzer 106 may identify a set of most common anomalous KPI types. The KPI analyzer may also identify a set of sites, cells, or frequency or time divisions of a cluster having the most detected anomalies.

Figure 2:
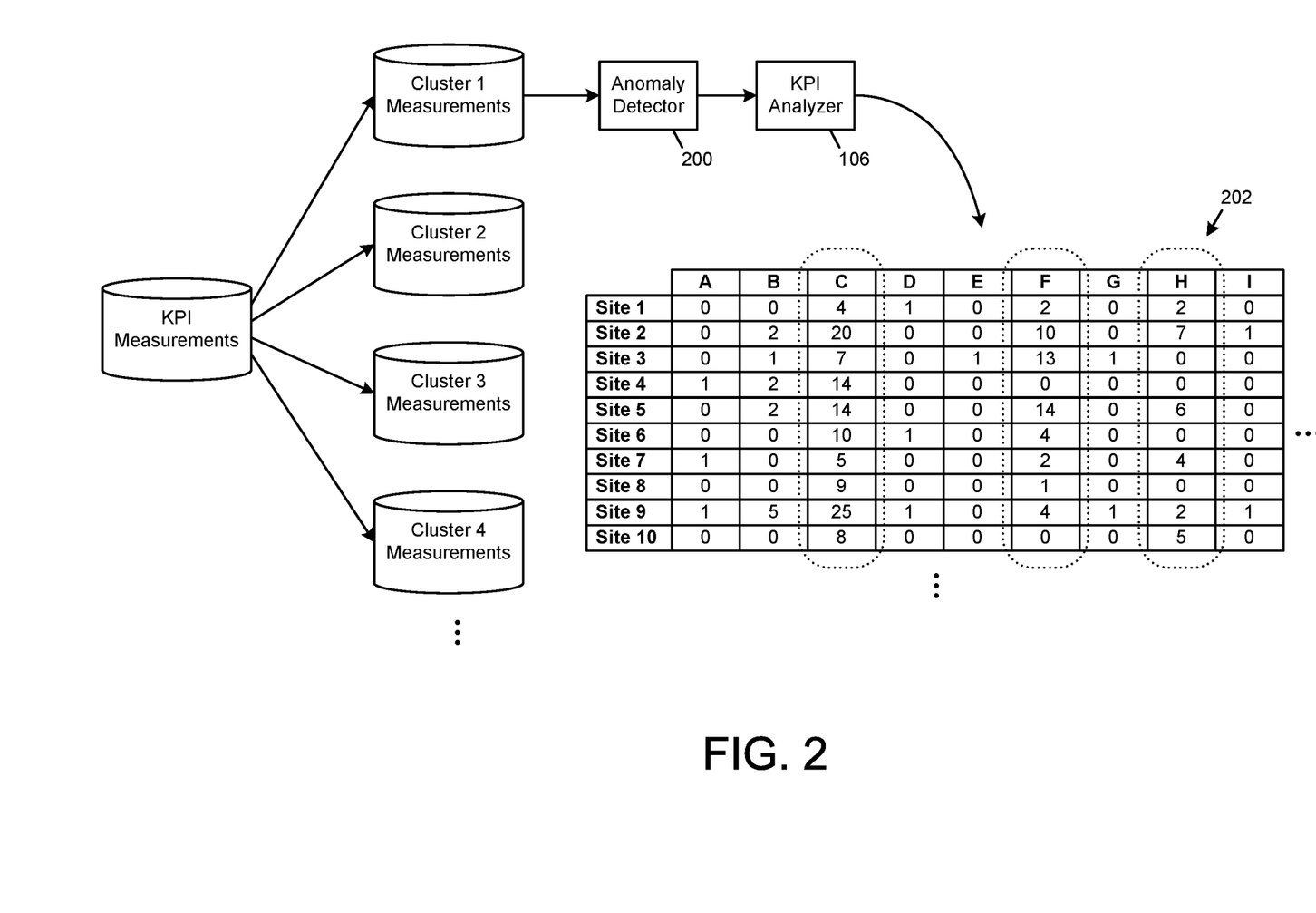
FIG. 2 conceptually illustrates the KPI analyzer identifying a set of most common anomalous KPI types.

FIG. 2 conceptually illustrates the KPI analyzer 106 identifying a set of most common anomalous KPI types. As illustrated, the KPI analyzer running in the computer device 108 receives KPI measurements from the different clusters of the RAN 102. Each of the KPI measurements is generated for one of several KPI types. An anomaly detector 200 performs anomaly detection on the KPI measurement from the different clusters.

The anomaly detector 200 may be a program running on one or more computing devices in the core network 104. The anomaly detector 200 may also be a program running on the computing device 108, which also hosts the KPI analyzer 106. In some embodiments, to detect anomalies in a KPI measurement, the anomaly detector 200 identifies an upper bound and a lower bound based on trend, seasonality, and variance of the KPI measurement. The anomaly detector reports a sample of the KPI measurement as an anomaly when the sample exceeds the identified upper bound or lower bound.

For each cluster of the RAN 102, the KPI analyzer 106 identifies one or more common anomalous KPI types. The KPI analyzer 106 regards a particular KPI type to be a common anomalous KPI type when the particular KPI type satisfy a ubiquity criterion. In some embodiments, the ubiquity criterion is satisfied when more than a threshold percentage (e.g., 50%) of the sites in the cluster generated for the particular KPI type have anomalies.

In the example of FIG. 2, a KPI-anomaly table 202 shows the counts of anomalous KPI measurements (i.e., KPI measurements determined to have anomalies by the anomaly detector 200) for each KPI type ("A" through "I") at each site (sites 1 through 10) of cluster 1. Based on the counts of the anomalous KPI measurements, the KPI analyzer 106 determines that at least KPI types "C", "F", "H" satisfies the ubiquity criterion because each of these KPI types have anomalies in more than 50% of the sites in cluster 1. In some embodiments, these example KPI types may correspond to some of the KPIs listed in Table 1 below:

TABLE 1

Example KPIs and Corresponding Explanations

| | |
|---|---|
| VOLTE ERLANGS | The number of Voice Over LTE Mobile originating call moving from source cell site to destination cell site |
| E RAB SETUP ATTEMPTS QC1 | The number of EUTRAN Radio Access Bearer attempts for Quality of Service Class Identifier 1, which is VoLTE |
| AVERAGE/ MAXIMUM RRC CONNECTED UES | The average number of Radio resource control connected devices in an instant of time in a given cell site |
| PCT PDCCH ALLOCATIONS WITH 1/3 OFDM SYMBOL | Percent of allocated Physical Downlink Control Channels in a cell utilizing three Orthogonal Frequency Division Multiplex symbol in Air interface resource |
| TOTAL/INITIAL PDCCH ORDER ATT E UTRAN | Number of initial or total PDCCH order attempts |
| AVG SINR FOR PUCCH | Average Signal to Noise ratio value for a given Physical Uplink Control Channel resource for a given time slot in the air interface |
| AVG RTWP RX ANTENNNA 1/4 | Average Received total Wide band Power for $1^{st}$ port of Received Antenna out of 4 ports |
| CSFB ATT | Circuit Switched Fall Back attempts when the UE is in 4G network that does not have Voice over LTE and falls back to UMTS 3G Circuit Switch Core |
| UE IDLE MODE | Radio Resource Control transition state when UE does not have any data to send |
| HO ATTEMPTS INTER ENB | The number of Handover attempts from source cell site to destination cell site |
| ERB REL ENB RNL RED | eNB initiated QCI1 E-RAB releases due to redirect to another cell |
| DATA/VOICE AFR | Data or Voice Access Failure Rate |
| DL/UL PRB UTIL | Downlink and Uplink Physical Resource Block Utilization |
| VOLTE ERL | Voice over LTE Erlang unit of measurement |
| VOLTE HANDOVER ATTEMPT NO | The number of Voice Over LTE Mobile originating call moving from source cell site to destination cell site |

In some embodiments, the KPI analyzer 106 identifies the common KPI types dynamically. Specifically, the different sites of different clusters of the RAN 102 generate KPI measurements in real-time, the anomaly detector 200 performs anomaly detection in real-time, and the KPI analyzer 106 correspondingly updates the counts of the anomalous KPI measurements in real-time. The KPI analyzer 106 may have a timing window such that only the KPI measurements generated or taken within a most recent time period (e.g., one week) are used to identify the common anomalous KPI types for a cluster.

The KPI analyzer 106 may rank the identified common anomalous KPI types for a cluster. In some embodiments, the ranking is based on the count or number of anomalous KPI measurements of each identified common anomalous KPI type. In some embodiments, the ranking is based on the count or number of sites that have anomalous KPI measurements of each identified common anomalous KPI type. In the example of FIG. 2, KPI type "C" has more than 100 anomalous KPI measurements and at least 10 sites with anomalous KPI measurements, KPI type F has at least 50 anomalous KPI measurements and at least 8 sites with anomalous KPI measurements, etc. The KPI analyzer 106 outputs (e.g., display) a list of the common anomalous KPI types for the cluster based on the ranking. The outputted list of the common anomalous KPI types may be updated dynamically based on the most recent KPI measurements.

Figure 3:
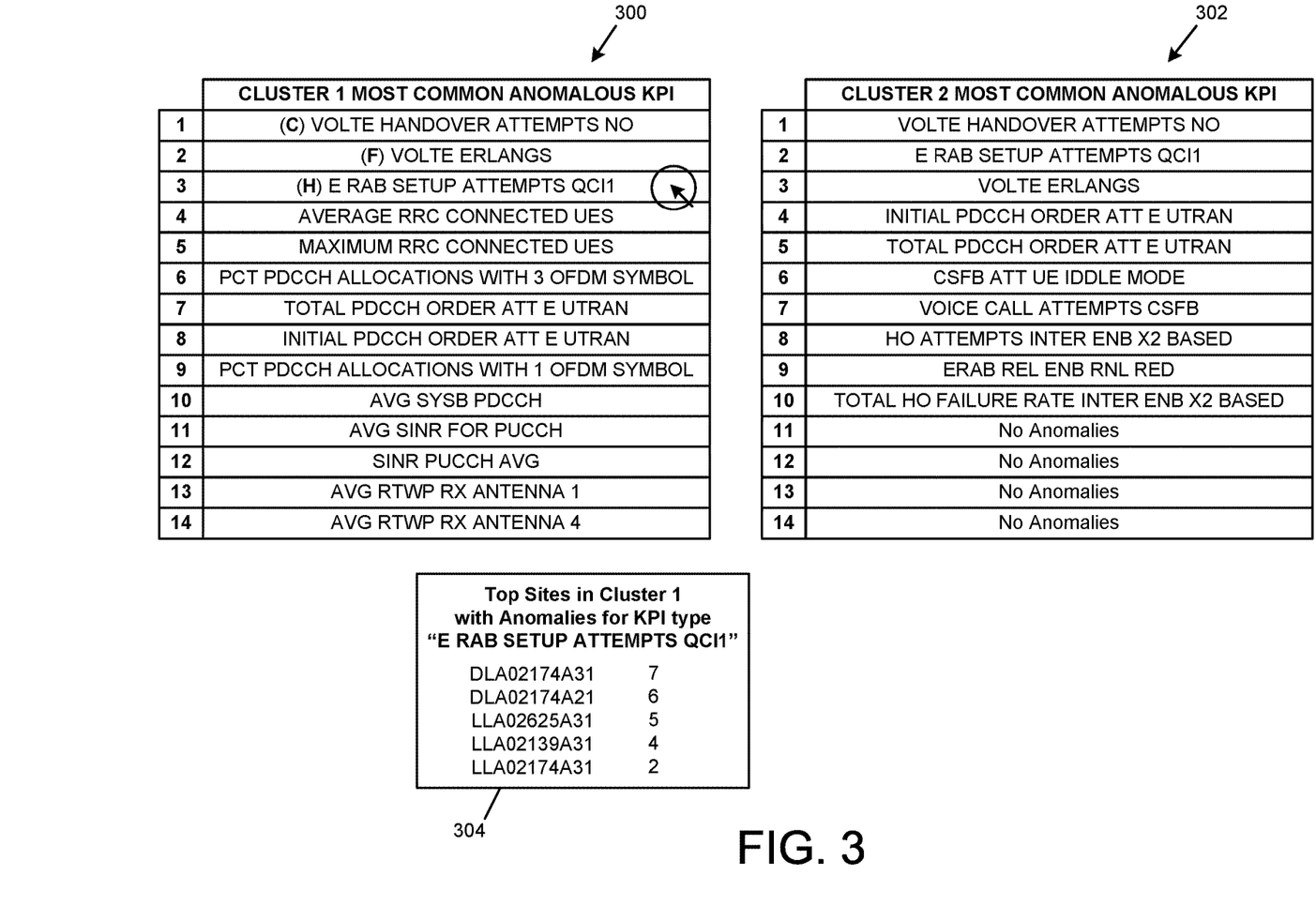
FIG. 3 illustrates example lists of common anomalous KPI types for different clusters.

FIG. 3 illustrates example lists 300 and 302 of common anomalous KPI types for different clusters. The list 300 is a ranked list of common anomalous KPI types for cluster 1. According to the list 300, for cluster 1 the most common anomalous KPI type is "VOLTE HANDOVER ATTEMPTS NO", the second most common anomalous KPI type is "VOLTE ERLANG", the third most common anomalous KPI type is "E RAB SETUP ATTEMPTS QC1", etc. (These common anomalous KPI types may corresponds to example KPI types "C", "F", "H", etc. of FIG. 2).

The list 302 is a ranked list of common anomalous KPI types for cluster 2. According to the list 302, for cluster 2 the most common anomalous KPI type is "VOLTE HANDOVER ATTEMPTS NO", the second most common anomalous KPI type is "E RAB SETUP ATTEMPTS QC1", the third most common anomalous KPI type is "VOLTE ERLANG", etc. For the list 302, there is no common anomalous KPI type after the 11$^{th}$ ranking position. In other words, in cluster 2, there are only 10 KPI types that satisfy the ubiquity criterion. In contrast, there are at least 15 KPI types that satisfy the ubiquity criterion for cluster 1.

In some embodiments, KPI analyzer 106 includes a user interface (UI) that allow a user to select a particular element of a ranked list or summary for further exploration. For example, the user may use the UI to select (e.g., hover over) one of the common anomalous KPI types in the list 300 or 302 to view additional information regarding the selected KPI type. The additional information may include a report of the sites having an anomalous KPI measurement of the selected KPI type. In the example of FIG. 3, the KPI analyzer 106 receives a selection of a KPI type "E RAB SETUP ATTEMPTS QCI1" in the list 300. The KPI analyzer 106 in turn opens a window 304 to report a list of sites in Cluster 1 having anomalous KPI measurements for the KPI type "E RAB SETUP ATTEMPTS QCI1".

The KPI analyzer 106 may also generate other lists or summaries for the RAN 102 based on the received KPI measurements. For example, in some embodiments, the KPI analyzer 106 ranks the sites (or cells) of a cluster based on an anomaly metric that is derived from the anomalous KPI measurements for each site (or cell) of the cluster, for all KPI types. The KPI analyzer 106 outputs a list of sites (or cells) of the cluster based on the ranking of the sites (or cells).

Figure 4:
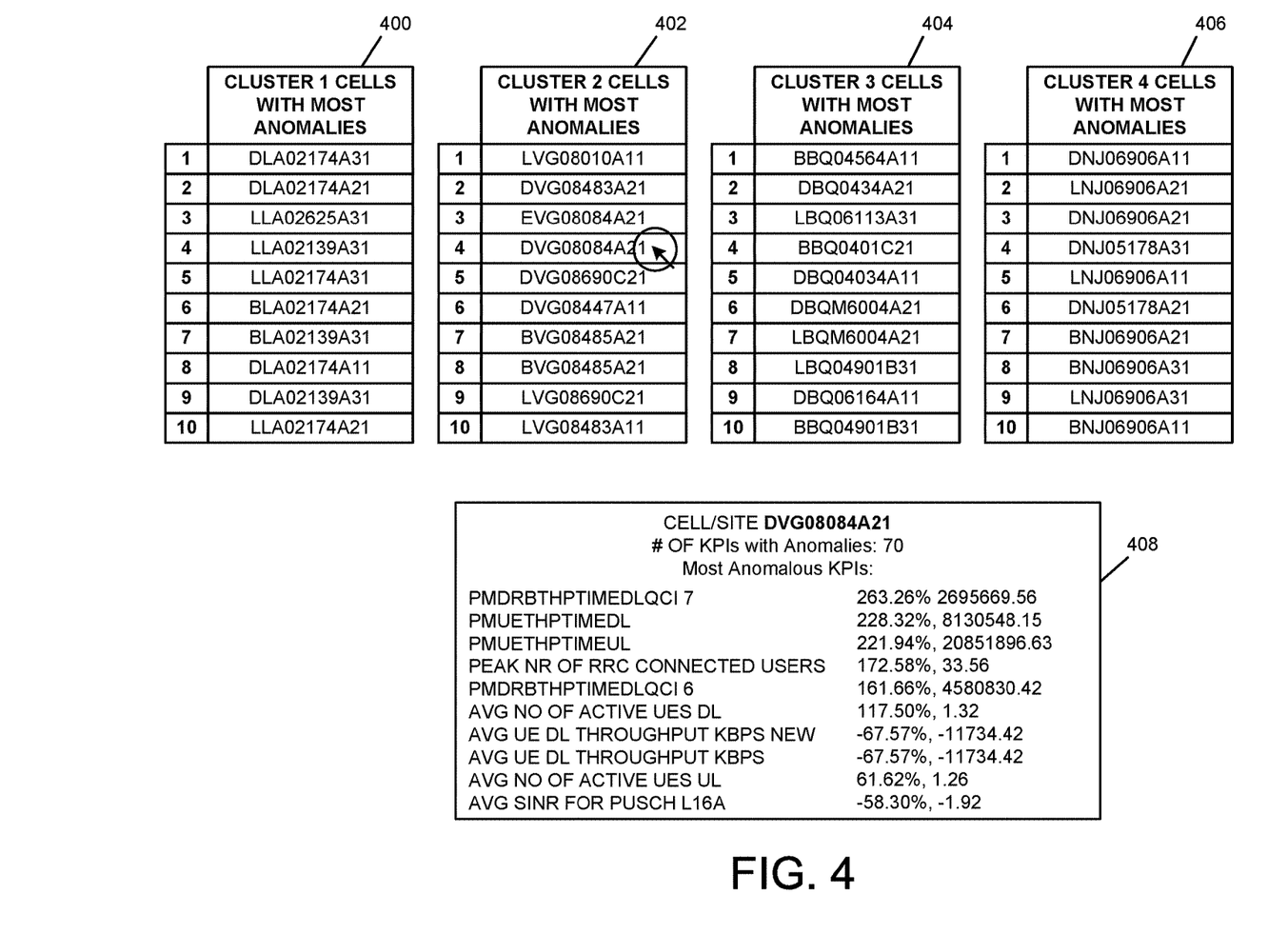
FIG. 4 illustrates several lists that each ranks the cells (or sites) of a cluster according to the KPI measurements received from the RAN.

FIG. 4 illustrates several lists that each ranks the cells (or sites) of a cluster according to the KPI measurements received from the RAN 102. As illustrated, the KPI analyzer 106 outputs four lists 400, 402, 404, and 406 for Clusters 1, 2, 3, and 4, respectively. Each list of a cluster displays ten cells (or sites) having the most anomalies in that cluster. Each list ranks the cells (or sites) of a cluster based on an anomaly metric for each cell (or site). The anomaly metric of a cell or site is derived from the anomalous KPI measurements (or anomalies) of the cell or site, such as percentage deviation, actual delta value, counts of anomalous KPI measurements, number of anomalous samples, etc. The KPI analyzer 106 then outputs a list of cells (or sites) of the cluster based on the ranking of the cells (or sites).

The figure also illustrates the UI being used to select (by hovering) a cell "DVG08084A21" in the list 402 for Cluster 2. The KPI analyzer 106 in turn opens a window 408 to report a list of the most anomalous KPIs (or KPI types) at the cell "DVG08084A21". The KPIs in the window 502 are sorted according to their corresponding anomaly metrics.

Figure 5:
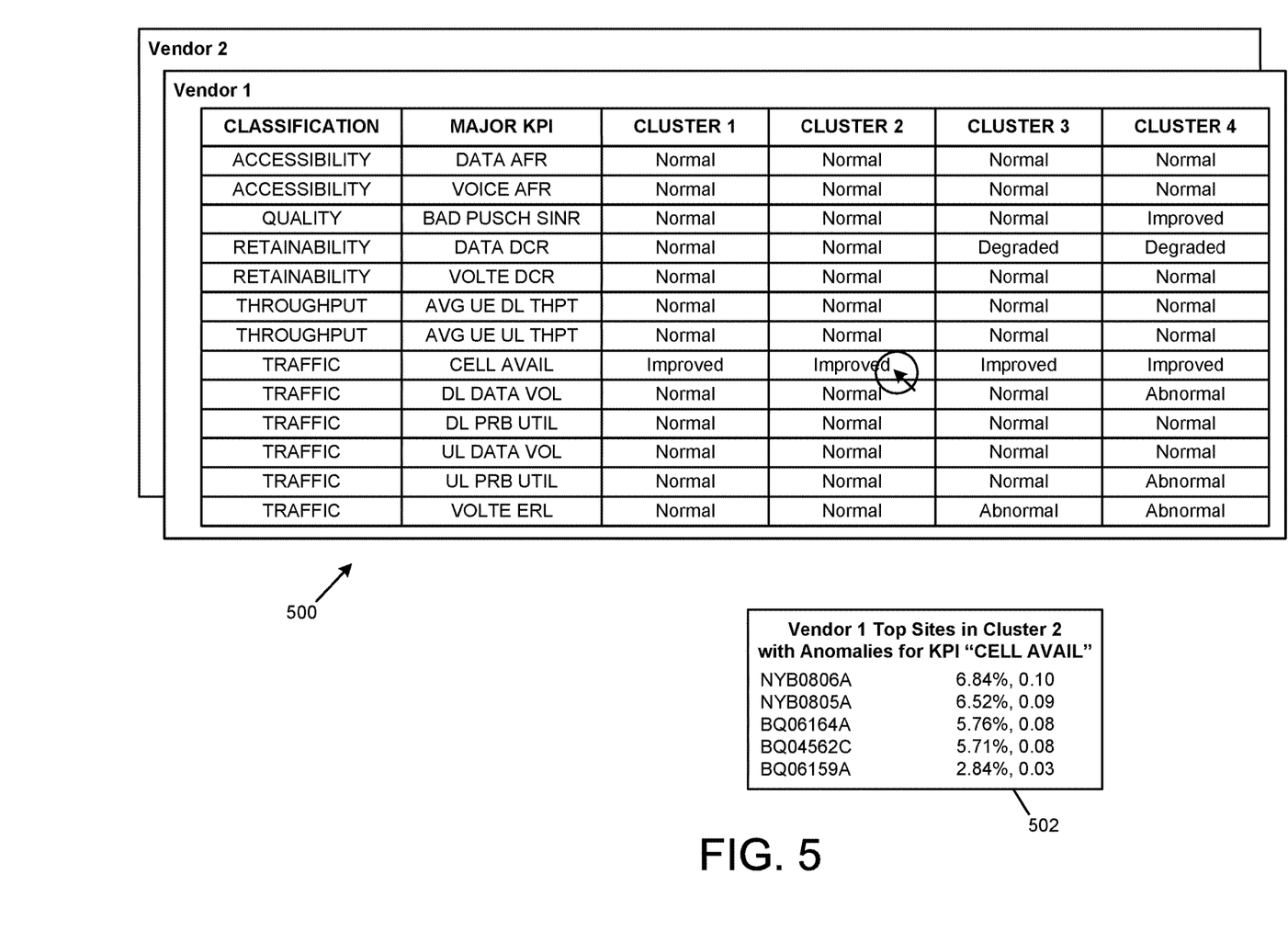
FIG. 5 illustrates an example summary of a predefined set of KPI types for different clusters.

In some embodiments, the KPI analyzer 106 can be configured to monitor a predefined set of KPI types. These predefined set of KPI types (also referred to as "Major" or "Goal-centric" KPIs) is provided to the KPI analyzer 106 by the administrator of the cellular network 100, customer organizations, and/or vendors of cellular devices and equipment, etc. The monitoring of the predefined set of KPI types may be for sites of different clusters or the RAN 102, as well as for different vendors or customers. For each of the predefined set of KPI types being monitored, the KPI analyzer indicates or reports a status based on an anomaly metric that is derived from the anomalies detected from the KPI measurements of the monitored KPI type, such as percentage deviation, actual delta value, counts of anomalous KPI measurements, number of anomalous samples, etc.

FIG. 5 illustrates an example summary of a predefined set of KPI types for different clusters. As illustrated, a summary 500 monitors a predefined set of KPI types that include KPI types such as "DATA AFR", "VOICE AFR", "BAD PUSCH SINR", "DATA DCR", "VOLTE DCR", "AVG UE DL THPT", "AVG UE UL THPT", etc. Each of these KPI types belongs to one of several classifications such as "ACCESSIBILITY", "QUALITY", "RETAINABILITY", "THROUGHPUT", and "TRAFFIC". The summary 500 shows the status of each KPI type in the predefined set for each cluster. The status is derived from KPI measurements collected from the sites of different clusters. Each status shows whether the KPI measurements of a KPI type is "normal" (e.g., the number of anomalies of the KPI type is within acceptable range or that the KPI measurements of the KPI type do not deviate from normal beyond a certain range), "improved", (e.g., the number of anomalies of the KPI type has decreased), "degraded" (e.g., the number of anomalies of the KPI type has increased), or "abnormal" (e.g., the KPI measurements of the KPI type deviate from normal beyond a certain range.)

The figure also illustrates the UI being used to select (by hovering) a status for the KPI type "CELL AVAIL" for Cluster 2 (which indicates "Improved"). The KPI analyzer 106 in turn opens a window 502 to report a list of the sites with the most anomalous KPI measurements for the KPI type at Cluster 2. The sites in the window 502 are sorted according to their corresponding anomaly metrics, e.g., percentage deviation, actual delta value, counts of anomalous KPI measurements, etc.

In some embodiments, the KPI analyzer 106 may generate different summaries for different vendors or customers. For example, different vendors may be interested in different sets of KPIs and therefore may have different predefined sets of KPI types for generating the summary 500. In another example, the KPI analyzer 106 may generate different sets of summaries for different vendors based on KPI measurements related to equipment or cellular devices that are specific to different vendors.

Example Computing Device

Figure 6:
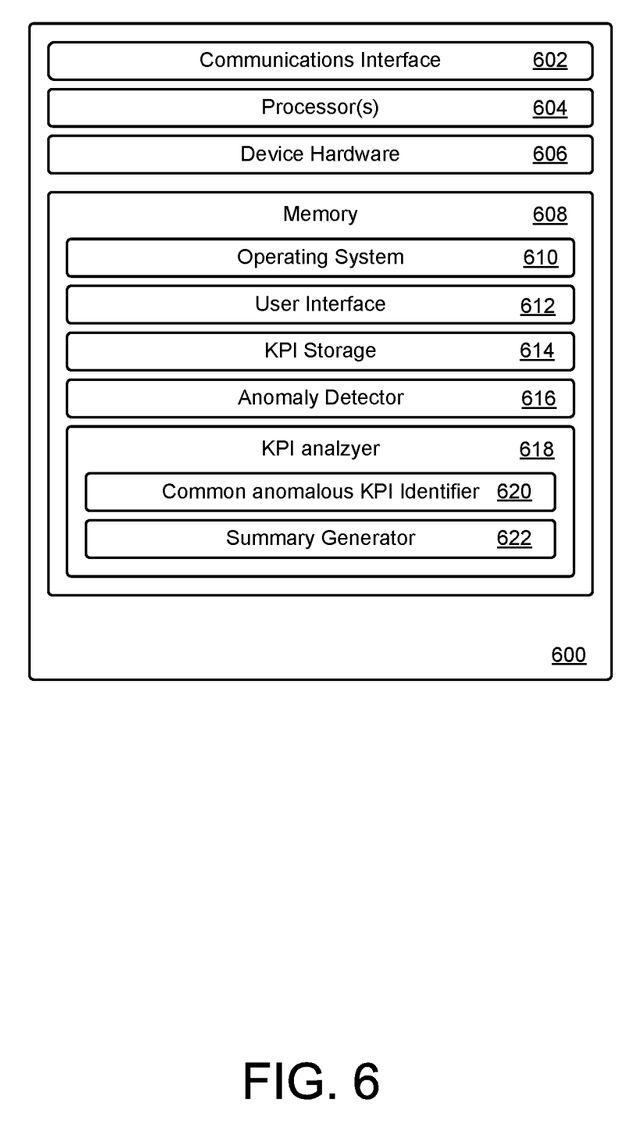
FIG. 6 is a block diagram showing various components of a computing device running the KPI analyzer.

FIG. 6 is a block diagram showing various components of a computing device 600 running the KPI analyzer 106 (e.g., the computing device 108), consistent with an embodiment of the disclosure. The computing device 600 operates as a network node of the core network 104 and is capable of receiving and analyzing multiple KPI measurements from the multiple sites in the multiple clusters of the RAN 102.

The computing device 600 may be a general-purpose computer, such as a desktop computer, tablet computer, laptop computer, server, or an electronic device that is capable of receiving input, processing the input, and generating output data. The computing device 600 may also be a virtual computing device such as a virtual machine or a software container that is hosted in a cloud. Alternatively, the computing device 600 may be substituted with multiple computing devices, virtual machines, software containers, and/or so forth.

The computing device 600 may be equipped with one or more of the following: a communications interface 602, one or more processors 604, device hardware 606, and memory 608. The communications interface 602 may include wireless and/or wired communication components that enable the computing devices to transmit data to and receive data from other devices. The data may be relayed through a dedicated wired connection or via a communications network. The device hardware 606 may include additional hardware that performs user interface, data display, data communication, data storage, and/or other server functions.

The memory 608 may be implemented using computer-readable medium, such as computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store information for access by a computing device. In contrast, communication media may embody computer-readable instructions, data structures, program modules, or other data in a modulated data signal, such as a carrier wave, or other transmission mechanisms.

The processors 604 and the memory 608 of the computing device 600 may implement an operating system 610, a user interface 612, a KPI storage 614, an anomaly detector 616, and a KPI analyzer 618. The KPI analyzer 618 includes a common anomalous KPI identifier 620 and a summary generator 622. The various software may include routines, program instructions, objects, and/or data structures that are executed by the processors 604 to perform particular tasks or implement particular abstract data types.

The operating system 610 may include components that enable the computing devices 600 to receive and transmit data via various interfaces (e.g., user controls, communications interface, and/or memory input/output devices), as well as process data using the processors 604 to generate output. The operating system 610 may include a presentation component that presents the output (e.g., display the data on an electronic display, store the data in memory, transmit the data to another electronic device, etc.). The operating system 610 may include a hypervisor that allows the computing device to operate one or more virtual machines and/or virtual network components. Additionally, the operating system 610 may include other components that perform various additional functions generally associated with an operating system.

The user interface 612 is a program that handles interaction with a human user. In some embodiments, the user interface 612 provides a graphical user interface (GUI) that visually presents various summaries and lists as GUI elements that can be manipulated. The user interface 612 also accepts user gestures such as hovering as input for selecting a particular item of a list or summary.

The KPI storage 614 is a region of the memory 608 for temporarily storing KPI measurements received from the RAN 102. The KPI storage 614 may also be used to store anomaly information for the KPI measurements (e.g., pointers that reference KPI measurements having the anomalous samples.) The KPI storage 614 may also be used to store a KPI-anomaly table (e.g., the KPI-anomaly table 202) for keeping track of the number of anomalous KPI measurements for different KPI types and for different sites of a cluster, which is used to identify common anomalous KPI types.

The anomaly detector 616 is a program for detecting anomalies in KPI measurements (e.g., implementing the anomaly detector 200). In some embodiments, the KPI measurements received by the computing device 600 are fed to the anomaly detector 616, and the detected anomalies are stored in the KPI storage 614 as anomaly information. In some embodiments, the anomaly detector 616 identifies an upper bound and a lower bound based on trend, seasonality, and variance of the KPI measurements. The anomaly detector 616 reports a sample of the KPI measurement as an anomaly when the sample exceeds the identified upper bound or lower bound.

The KPI analyzer 618 (e.g., implementing the KPI analyzer 106) is the program that generates and presents summaries based on KPI measurements that the computing device 600 received from the RAN 102 through the communications interface 602. The KPI analyzer 618 also uses the anomaly information stored in the KPI storage to identify common anomalous KPI types and to determine which sites, cells, or frequency bands are the most anomalous.

The common anomalous KPI identifier 620 is a program or a module of the KPI analyzer 618 that identifies the common anomalous KPI types by maintaining and using the KPI-anomaly table 202 (stored in the KPI storage 614) to determine which KPI types meet the ubiquity criterion (e.g., having anomalies in more than 50% of the sites in the cluster.)

The summary generator 622 is a program or a module of the KPI analyzer 618 that calculates statistics such as the percentage deviation, the actual delta value of the anomalies, and/or the number of anomalous samples or KPI measurements as anomaly metrics for different sites, cells, or frequency/time divisions for different vendors. The summary generator 622 in turn uses the calculated statistics to rank the different KPI types, sites, cells, or frequency/time divisions and presents a summary or list accordingly.

Figure 7A:
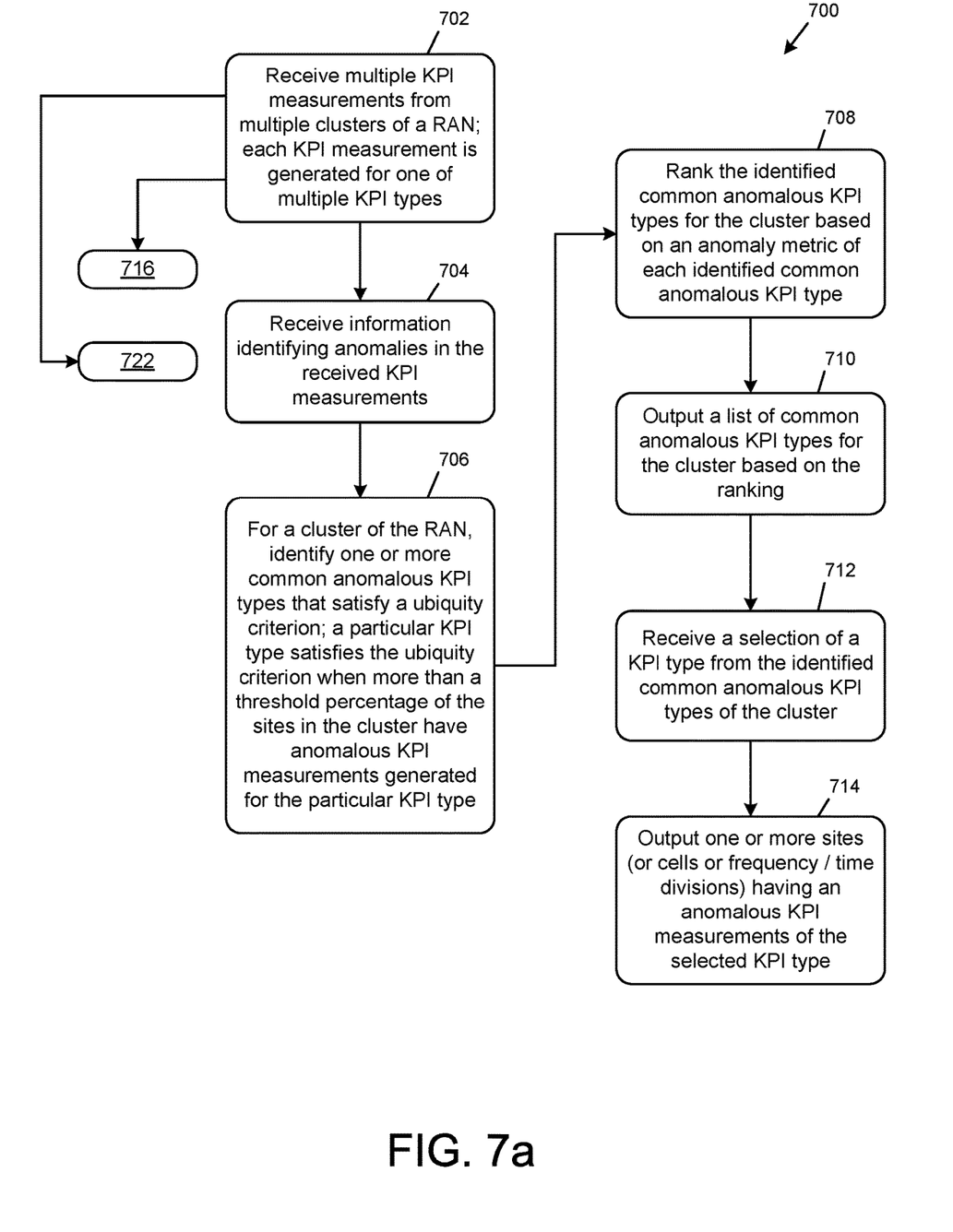
FIGS. 7a-b conceptually illustrate a flow diagram of an example process performed by the KPI analyzer.
Figure 7B:
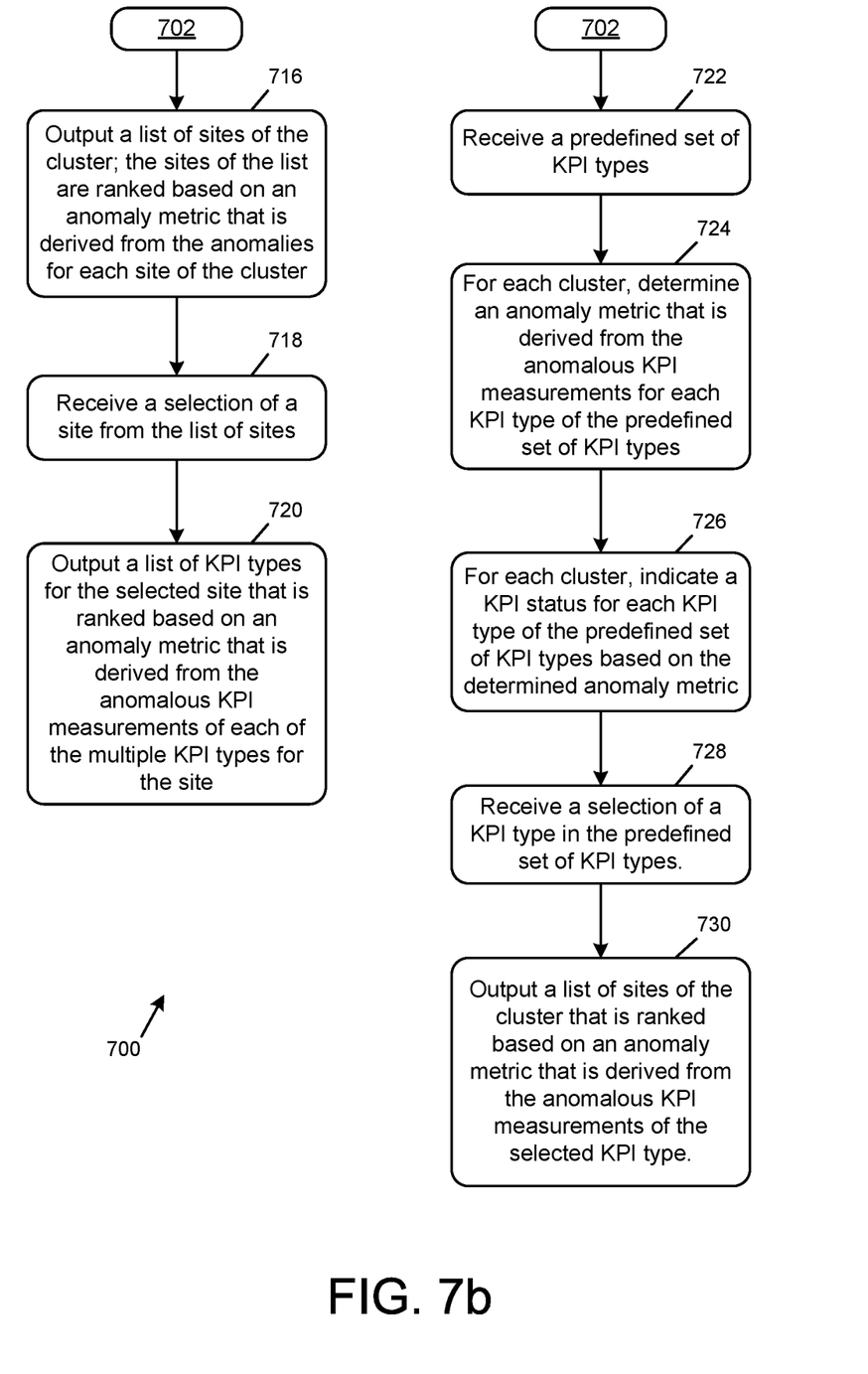

FIGS. 7*a*-*b* conceptually illustrates a flow diagram of an example process 700 performed by the KPI analyzer 106. The process 700 is performed by the computing device 600, which operate as a network node of the core network 104 and is capable of receiving and analyzing KPI measurements from the multiple sites in the multiple clusters of the RAN 102.

The process 700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 702, the KPI analyzer receives multiple KPI measurements from the multiple clusters of the RAN, each of the multiple KPI measurements generated for one of several KPI types. Examples of KPI types are described by reference to FIG. 1 and FIG. 3 above. The process may then proceed to block 704, block 716, and/or block 722.

At block 704, the KPI analyzer receives anomaly information identifying anomalous KPI measurements (or anomalies) in the received KPI measurements. In some embodiments, such anomaly information is provided by an anomaly detector, which may be a program running on the computing device 600 or another computing device in the core network 104.

At block 706, for a cluster of the RAN, the KPI analyzer identifies one or more common anomalous KPI types that satisfy a ubiquity criterion. A particular KPI type satisfies the ubiquity criterion when more than a threshold percentage of the sites in the cluster have anomalous KPI measurements (or anomalies) generated for the particular KPI type.

At block 708, the KPI analyzer ranks the identified common anomalous KPI types for the cluster based on an anomaly metric that is derived from the anomalous KPI measurements of each identified common anomalous KPI type. At block 710, the KPI analyzer outputs a list of common anomalous KPI types for the cluster based on the ranking (e.g., lists 300 and 302). The anomaly metric may be a count of sites having anomalous KPI measurements, a count of anomalous KPI measurements, a percentage deviation of the anomalous KPI measurements from expected values, and/or an actual delta value of the anomalous KPI measurements from expected values.

At block 712, the KPI analyzer receives a selection of a KPI type from the identified common anomalous KPI types of the cluster. At block 714, the KPI analyzer outputs one or more sites (or cells or time/frequency divisions) (e.g., in window 304) having anomalous KPI measurements (or anomalies) of the selected KPI type.

At block 716, the KPI analyzer outputs a list of sites of the cluster (e.g., lists 400-406). The sites of the list are ranked based on an anomaly metric that is derived from the anomalous KPI measurements (or anomalies) for each site of the cluster. At block 718, the KPI analyzer receives a selection of a site from the list of sites. At block 720, the KPI analyzer outputs a list of KPI types for the selected site that is ranked based on anomaly metrics that are derived from the anomalous KPI measurements of the multiple KPI types for the site (e.g., window 408).

At block 722, the KPI analyzer receives a predefined set of KPI types. Such a predefined set of KPI types may be specific to a vendor or a customer organization. At block 724, for each cluster of a set of clusters in the RAN, the KPI analyzer determines an anomaly metric that is derived from the anomalous KPI measurements for each KPI type of the predefined set of KPI types. At block 726, for each cluster of a set of clusters in the RAN, the KPI analyzer indicates a KPI status for each KPI type of the predefined set of KPI types based on the determined anomaly metric (e.g., in list 500). The KPI status may be one of normal, improved, degraded, or abnormal as described by reference to FIG. 5 above. At block 728, the KPI analyzer receives a selection of a KPI type in the predefined set of KPI types. At block 730, the KPI analyzer outputs a list of sites of the cluster (e.g., window 502) that is ranked based on an anomaly metric that is derived from the anomalous KPI measurements of the selected KPI type for each site.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device operating as a network node in a core network of a cellular network, the computing device being configured to monitor a radio access network (RAN) of the cellular network, the RAN comprising a plurality of clusters, each cluster comprising a plurality of sites and a plurality of cells, each site communicates over one or more frequency or time divisions with cellular devices that are located in one or more cells, the computing device comprising:
   one or more processors; and
   a computer-readable medium storing a plurality of computer-executable components that are executable by the one or more processors to perform a plurality of actions, the plurality of actions comprising:
      receiving a plurality of key performance indicator (KPI) measurements from the plurality of clusters, each of the plurality of KPI measurements generated for one of a plurality of KPI types;
      receiving information identifying anomalous KPI measurements in the received KPI measurements;
      for a cluster of the RAN, identifying one or more common anomalous KPI types that satisfy a ubiquity criterion, wherein a particular KPI type satisfies the ubiquity criterion when more than a threshold percentage of the sites in the cluster have anomalous KPI measurements generated for the particular KPI type;
      determining, for each of the identified common anomalous KPI types for the cluster, a classification from a group of classifications, wherein at least one classification corresponds to two or more of the identified common anomalous KPI types;
      ranking the identified common anomalous KPI types for the cluster based on an anomaly metric that is derived from the anomalous KPI measurements generated for each identified common anomalous KPI type;
      outputting a list of sites of the cluster that are ranked based on anomaly metrics that are derived from the anomalous KPI measurements for the sites of the cluster;
      receiving a selection of a site from the list of sites;
      outputting a list of KPI types for the selected site that is ranked based on anomaly metrics that are derived from the anomalous KPI measurements of the plurality of KPI types for the site; and
      outputting a list of common anomalous KPI types and corresponding classifications for the cluster based on the ranking.

2. The computing device of claim 1, wherein the plurality of actions further comprises:
   receiving a selection of a KPI type from the identified common anomalous KPI types of the cluster; and
   outputting one or more sites having anomalous KPI measurements of the selected KPI type.

3. The computing device of claim 1, wherein the plurality of actions further comprises:
   outputting a list of cells of the cluster that is ranked based on anomaly metrics that are derived from the anomalous KPI measurements for the cells of the cluster.

4. The computing device of claim 1, wherein the plurality of actions further comprises:
- receiving a predefined set of KPI types; and
- for each cluster of a set of clusters in the RAN:
  - determining an anomaly metric that is derived from the anomalous KPI measurements for each KPI type of the predefined set of KPI types; and
  - indicating a KPI status for each KPI type of the predefined set of KPI types based on the determined anomaly metric.

5. The computing device of claim 4, wherein the plurality of actions further comprises:
- receiving a selection of a KPI type in the predefined set of KPI types; and
- outputting an additional list of sites of the cluster that is ranked based on an anomaly metric that is derived from the anomalous KPI measurements of the selected KPI type from each site.

6. A computer-implemented method for monitoring a radio access network (RAN) comprising a plurality of clusters, each cluster comprising a plurality of sites and a plurality of cells, each site communicating over one or more frequency or time divisions with cellular devices that are located in one or more cells, the method comprising:
- receiving, at a network node of a core network associated with the RAN, a plurality of key performance indicator (KPI) measurements from the plurality of clusters, each of the plurality of KPI measurements generated for one of a plurality of KPI types;
- receiving information identifying anomalous KPI measurements in the received KPI measurements;
- for a cluster of the RAN, identifying one or more common anomalous KPI types that satisfy a ubiquity criterion, wherein a particular KPI type satisfies the ubiquity criterion when more than a threshold percentage of the sites in the cluster have anomalous KPI measurements generated for the particular KPI type;
- determining, for each of the identified common anomalous KPI types for the cluster, a classification from a group of classifications, wherein at least one classification corresponds to two or more of the identified common anomalous KPI types;
- ranking the identified common anomalous KPI types for the cluster based on an anomaly metric that is derived from the anomalous KPI measurements generated for each identified common anomalous KPI type;
- outputting a list of sites of the cluster that are ranked based on anomaly metrics that are derived from the anomalous KPI measurements for the sites of the cluster;
- receiving a selection of a site from the list of sites;
- outputting a list of KPI types for the selected site that is ranked based on anomaly metrics that are derived from the anomalous KPI measurements of the plurality of KPI types for the site; and
- outputting a list of common anomalous KPI types and corresponding classifications for the cluster based on the ranking.

7. The computer-implemented method of claim 6, further comprising:
- receiving a selection of a KPI type from the identified common anomalous KPI types of the cluster; and
- outputting one or more sites having anomalous KPI measurements of the selected KPI type.

8. The computer-implemented method of claim 6, further comprising:

outputting a list of cells of the cluster that is ranked based on anomaly metrics that are derived from the anomalous KPI measurements for the cells of the cluster.

9. The computer-implemented method of claim 6, further comprising:
- receiving a predefined set of KPI types; and
- for each cluster of a set of clusters in the RAN:
  - determining an anomaly metric that is derived from the anomalous KPI measurements for each KPI type of the predefined set of KPI types; and
  - indicating a KPI status for each KPI type of the predefined set of KPI types based on the determined anomaly metric.

10. The computer-implemented method of claim 9, further comprising:
- receiving a selection of a KPI type in the predefined set of KPI types;
- outputting an additional list of sites of the cluster that is ranked based on an anomaly metric that is derived from the anomalous KPI measurements of the selected KPI type from each site.

11. One or more non-transitory computer storage media of a computing device storing computer-executable instructions for monitoring a radio access network (RAN) comprising a plurality of clusters, each cluster comprising a plurality of sites and a plurality of cells, each site communicating over one or more frequency or time divisions with cellular devices that are located in one or more cells, wherein upon execution the computer-executable instructions causing one or more processors to perform acts comprising:
- receiving, at a network node of a core network associated with the RAN, a plurality of key performance indicator (KPI) measurements from the plurality of clusters, each of the plurality of KPI measurements generated for one of a plurality of KPI types;
- receiving information identifying anomalous KPI measurements in the received KPI measurements;
- for a cluster of the RAN, identifying one or more common anomalous KPI types that satisfy a ubiquity criterion, wherein a particular KPI type satisfies the ubiquity criterion when more than a threshold percentage of the sites in the cluster have anomalous KPI measurements generated for the particular KPI type;
- determining, for each of the identified common anomalous KPI types for the cluster, a classification from a group of classifications, wherein at least one classification corresponds to two or more of the identified common anomalous KPI types;
- ranking the identified common anomalous KPI types for the cluster based on an anomaly metric that is derived from the anomalous KPI measurements generated for each identified common anomalous KPI type;
- outputting a list of sites of the cluster that are ranked based on anomaly metrics that are derived from the anomalous KPI measurements for the sites of the cluster;
- receiving a selection of a site from the list of sites;
- outputting a list of KPI types for the selected site that is ranked based on anomaly metrics that are derived from the anomalous KPI measurements of the plurality of KPI types for the site; and
- outputting a list of common anomalous KPI types and corresponding classifications for the cluster based on the ranking.

12. The one or more non-transitory computer-readable media of claim 11, wherein the acts further comprise:

receiving a selection of a KPI type from the identified common anomalous KPI types of the cluster; and outputting one or more sites having anomalous KPI measurements of the selected KPI type.

13. The one or more non-transitory computer-readable media of claim 11, wherein the acts further comprise:
   outputting a list of cells of the cluster that is ranked based on anomaly metrics that are derived from the anomalous KPI measurements for the cells of the cluster.

14. The one or more non-transitory computer-readable media of claim 11, wherein the acts further comprise:
   receiving a predefined set of KPI types; and
   for each cluster of a set of clusters in the RAN:
      determining an anomaly metric that is derived from the anomalous KPI measurements for each KPI type of the predefined set of KPI types; and
      indicating a KPI status for each KPI type of the predefined set of KPI types based on the determined anomaly metric.

15. The one or more non-transitory computer-readable media of claim 11, wherein the acts further comprise:
   receiving a selection of a KPI type in the predefined set of KPI types;
   outputting an additional list of sites of the cluster that is ranked based on an anomaly metric that is derived from the anomalous KPI measurements of the selected KPI type from each site.

* * * * *